Figure 1:
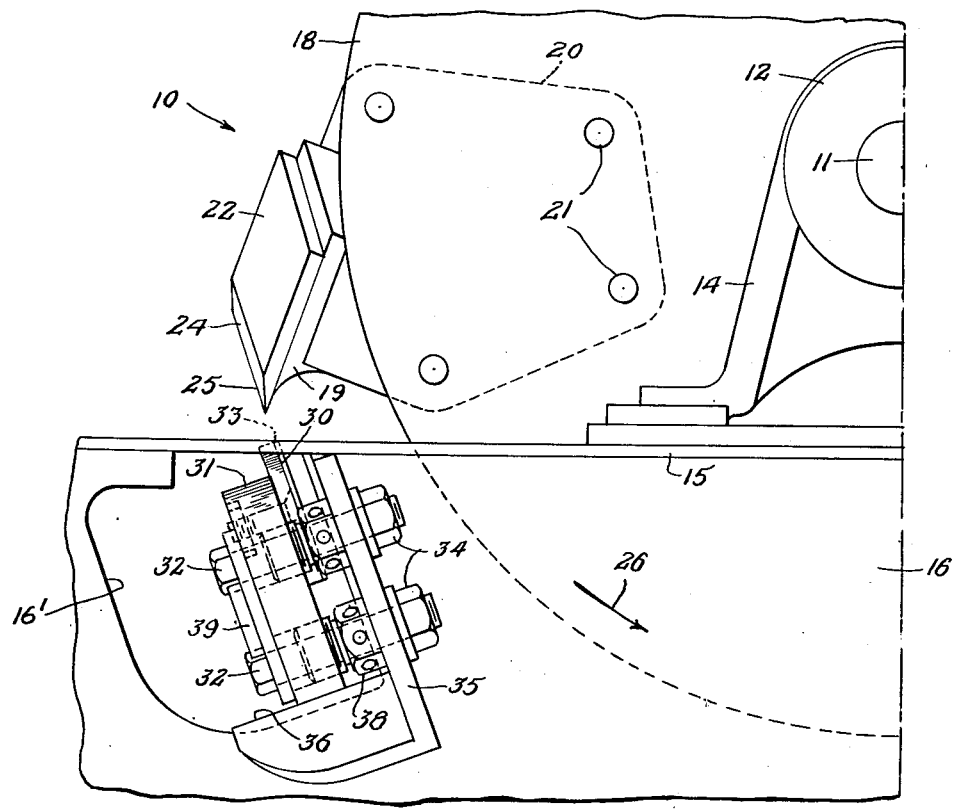

Feb. 19, 1963   L. B. MARTIN   3,077,911
SHEAR BAR MOUNTING
Filed Sept. 24, 1958   2 Sheets-Sheet 1

INVENTOR.
LESTER B. MARTIN
BY
Joseph Allen Brown
ATTORNEY

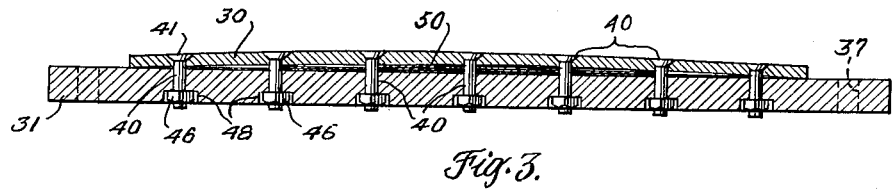
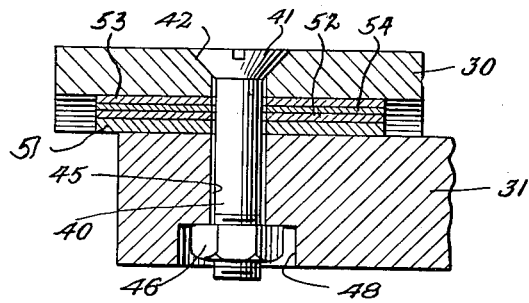
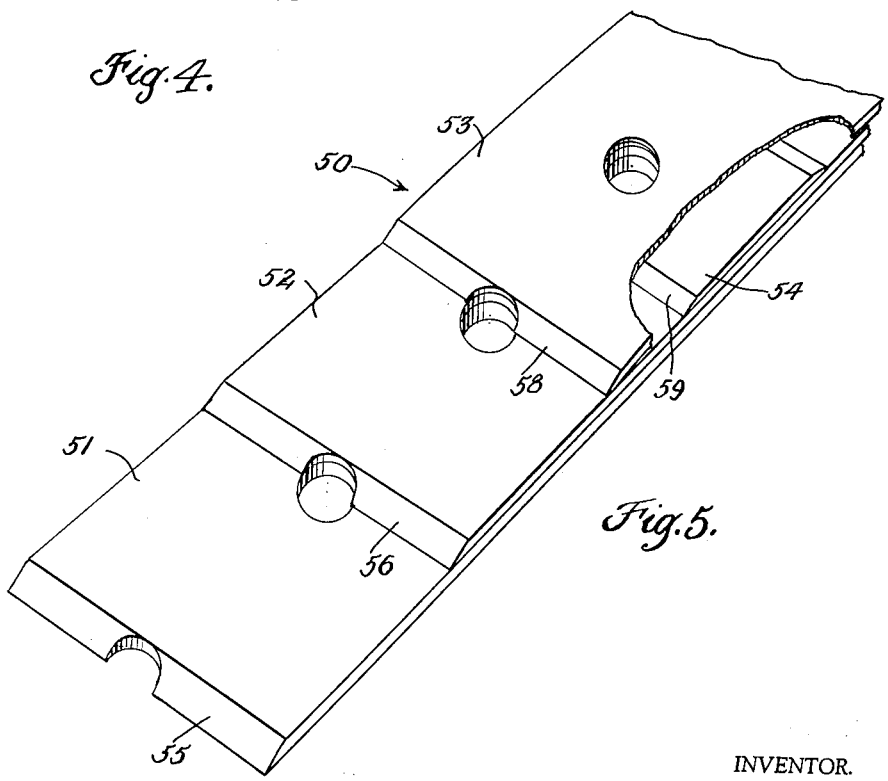

United States Patent Office 3,077,911
Patented Feb. 19, 1963

3,077,911
SHEAR BAR MOUNTING
Lester B. Martin, Lancaster, Pa., assignor to Sperry Rand Corporation, New Holland, Pa., a corporation of Delaware
Filed Sept. 24, 1958, Ser. No. 763,028
7 Claims. (Cl. 146—117)

This invention relates to reel type cutting or chopping mechanisms. More particularly, the invention relates to improved means for mounting a shear bar in a forage harvester having a reel type chopping mechanism as shown and described in U.S. Patent No. 2,735,469 issued February 21, 1956.

The mechanism shown in Patent No. 2,735,469 includes a feeder for conveying field forage through an opening and into a chopper where the material is comminuted and then discharged through a pipe by action of blower means. The chopper comprises a reel having a plurality of knives operable successively with a stationary shear bar. Each knife is flat; and, it has a straight cutting edge. At one lateral end of the reel, the knives are uniformly tangentially displaced forwardly relative to their respective opposite ends so that all of the knives extend at an angle to the rotational axis of the reel and to the shear bar. This mounting enables the knives to successively cooperate with the shear bar in such a manner that a shearing action is exerted on material moving through the feed passage and between the shear bar and cutting reel.

The mounting of the reel knives is such that the respective ends of the cutter knives are equidistant from the axis of the reel, whereas the centers or midsections of the knives lie somewhat closer to the reel axis. Because of this, the rotating cutting edges of the knives generate a hyperboloid; and, to obtain a good cutting action, it is essential that the shear bar be bowed toward the cutting reel so that its cutting edge closely approximates a hyperbolic curve contiguous to the hyperboloid generated by the reel.

The amount of bowing or curvature required for the shear bar is readily obtainable through mathematical calculations. However, to provide a shear bar with such a curvature and at low cost has constituted a substantial problem. It has been proposed, heretofore, to provide a flat support and a flat shear bar, the respective parts having registering bores to receive fastening members. Positionable between the support and shear bar are washers or spacers of uniform thickness. The washers seat in and project from counterbores in the support, such counterbores being of varying depths whereby the outward projection of the respective washers vary. By having a central washer which projects the most and then having washers on either side of the central washer which project progressively less, the shear bar may be bowed when it is drawn toward the support by the fastening means, assuming a curve as described by the engagement of the bar with the washers.

The use of spacer washers, while very economical and easily manufactured, is not altogether satisfactory because only a portion of the washers engage the shear bar, the respective washers having a flat outer face extending parallel to the support while the shear bar is bowed relative to it. As a result, only a limited amount of seat or support for the bar is provided. Since the shear bar is subjected to considerable forces during a chopping operation, it is desirable that it be provided with a mounting which gives it maximum support, considering however the costs involved and the keeping of such costs to a minimum.

A primary object of this invention is to provide, in a cutter mechanism of the character described, means for connecting a normally flat shear bar to a flat support in such a way that the shear bar is bowed relative to the support, such means insuring a firm and substantial seat for the shear bar.

Another object of this invention is to provide a shear bar mounting which provides a firm and substantial support for the shear bar and at a cost comparable to production costs of prior mounting structures.

A further object of this invention is to provide shear bar mounting means of simple construction requiring no particular skill in mounting the shear bar in the cutter mechanism.

Other objects of this invention will be apparent hereinafter from the specification and from the recital in the appended claims.

Figure 2:
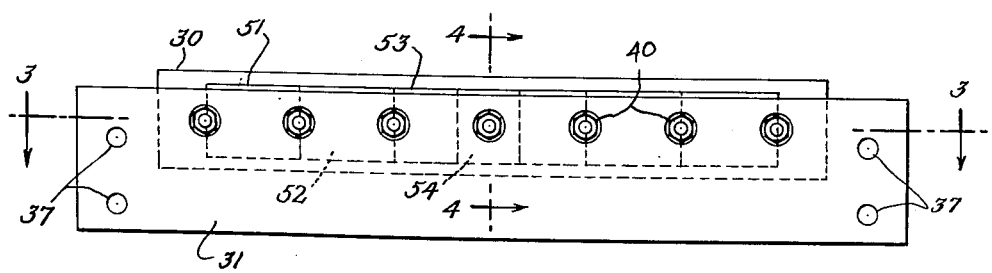

In the drawings:
FIG. 1 is a fragmentary side elevation of a portion of a reel type chopping mechanism having a shear bar mounted according to one embodiment of this invention;
FIG. 2 is a side elevation showing the shear bar and its support;
FIG. 3 is a section taken on the line 3—3 of FIG. 2 looking in the direction of the arrows and illustrating the means for bowing the shear bar when it is fastened to the support;
FIG. 4 is a section, in an enlarged scale, taken on the line 4—4 of FIG. 2 and looking in the direction of the arrows; and
FIG. 5 is an enlarged fragmentary perspective view showing the shear bar bowing means of this invention.

Referring now to the drawings by numerals of reference, and particularly to FIG. 1, 10 denotes generally a cutter reel of the type shown in U.S. Patent No. 2,735,469. Reel 10 is mounted on a shaft 11 driven from a source of power, not shown. Shaft 11 is journaled for rotation in spaced bearings 12, one of which is shown. Each bearing is supported on a pedestal 14 mounted on a portion 15 of a frame 16.

Reel 10 includes a pair of relatively spaced, parallel discs 18 rotatable about a common axis and having hubs which are keyed to shaft 11. Extending between discs 18 are knife supports 19 having lateral end plates 20 bolted or otherwise secured at 21 to the discs. Each support carries a knife 22 beveled along one edge 24 to provide a cutting edge 25. The knives are disposed in a generally tangential plane, and their cutting edges are presented in the direction of rotation of the reel indicated by the arrow 26. The mounting of the knives is such that the knives generate a hyperboloid when the reel is rotated. The specific mounting structure for the reel knives is fully disclosed in the previously mentioned patent.

Cooperative with the reel knives is a stationary elongated shear bar 30 which extends through openings 16' in relatively spaced side walls of frame 16. The shear bar is carried on an elongated support 31. In FIG. 1, only one end of the shear bar support structure is shown, it being understood that the opposite end of the bar is similarly supported. At each end, support 31 is connected by bolts 32 and nuts 34 to a bracket 35 welded or otherwise fastened to frame 16. Bolts 32 pass through appropriate holes 37 (FIG. 2) in support 31. The bracket 35 has an inclined portion 36 which provides a seat for support 31 and insures a proper angular disposition of the shear bar carried thereon relative to the cutter reel 10. Threaded hex thimbles 38 are provided on bolts 32 for use in obtaining proper adjustment of the support 31 and the shear bar 30 toward or away from the cutter reel. A lock-plate 39 is provided between the heads of bolts 32 to prevent them from turning because of vibrations or for other reasons once the shear bar 30 has been adjusted and locked in position.

Shear bar 30 is long and rectangular. It is manufactured flat, having, however, sufficient resiliency to permit it to be bowed. The shear bar has a cutting edge 33 which is normally straight. Support 31 is also long and rectangular, although of such rigidity that it will not readily bow. Shear bar 30 is connected to the support 31 by seven uniformly spaced bolts 40 (FIG. 2). Bolts 40 have heads 41 (FIG. 4) which seat in countersunk portions 42 in the shear bar. The bolts extend through openings 44 in the shear bar and openings 45 in support 31. A nut 46 is threadable on each of the bolts 40, such nuts fitting into suitable openings 48 in the support 31 adapted to receive them.

As shown in FIG. 2, the shear bar 30 is connected to the support 31 so that it projects above the support for cooperation with the cutter reel knives 22. Shear bar 30 is bowed outwardly by bowing means 50 (FIG. 3) interposed between the shear bar and the support. Such bowing means comprises four shim plates 51, 52, 53 and 54. The shim plates are of different lengths. Also, they are of different thicknesses. The shims are of rectangular configuration and adapted to extend in the direction of elongation of the support and shear bar. Shims 51, 52, 53 and 54 have end bearing edges 55, 56, 58 and 59, respectively, which extend perpendicular to the extension of the shims. Such edges are preferably beveled, as shown in FIG. 5 so that the side of each shim facing shear bar 30 is shorter than the side facing support 31.

As shown in FIG. 2, shim 51 extends between the two outside fastening bolts. Shim 52 extends between the fastening bolts next to the outside bolts. Shim 53 extends between the fastening bolts on either side of the central bolt and shim 54 is disposed so that the center bolt passes through the center of the shim.

With this structure, when shear bar 30 is mounted on support 31 and tightened down, the clamping force of the bolts bows the bar and brings it against the lateral edges of the shims. The shims are held in a vice like clamp between the shear bar and the support.

In view of the different lengths of the shim plates, when they are disposed between the support and shear bar, and mounted one against the other, they provide a pyramid whereby drawing the shear bar toward support 31 causes the bar to curve. The shear bar engagement with the lateral edges of the shims determines the curve which the shear bar will assume. The lengths of the shims are controlled by the desire to have the bolts pass through the lateral edges of the shims so that the shims will be held with maximum effect. The thicknesses of the shims are determined by the curvature desired in the shear bar 30. Shim 51 is the thickest. From there, the thicknesses of the shims progressively decrease from shim 52, to shim 53 and finally to shim 54.

While the shims may be mounted successively one on top of the other according to length and thickness, preferably shim 51 is placed against the support 31 followed by shim 52 and then shim 54, with shim 53 overlying the shim 54, the shortest of the four. In this way, shim 53 bows with the shear bar and provides a substantial central seat for the bar.

Preferably, in manufacture, the shims are spot welded together to form a unit ready for mounting in the forage harvester. The variations in thickness of some of the shims might be difficult to detect with the naked eye, the drawings thereof being exaggerated for purposes of illustration. However, with the present structure, knowing the thicknesses of the respective shims is not required since the proper mounting of the shims is readily obtainable by observing the respective lengths of the shims.

The above structure supports the shear bar more solidly than does a support wherein washers or the like are employed. It is of very low cost both from the standpoint of materials used and labor in assembly.

While this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising a plurality of shims positioned one against another between said support and said shear bar, each shim having end bearing edges which extend generally perpendicular to the elongation of the knife and support, and said shims being of different lengths, and fastening members extending through shear bar and said shims and into said support.

2. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising a plurality of shims positioned one against another between said support and said shear bar, each shim having end bearing edges which extend generally perpendicular to the elongation of the knife and support, said shims being of different lengths and thicknesses, fastening members extending through said shear bar and said shims and into said support, and means being provided to connect said shims to each other independently of said fastening members whereby the shims may be installed as a unit.

3. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising a plurality of shims positioned one against another between said support and said shear bar, each shim having end bearing edges which extend generally perpendicular to the elongation of the shear bar and support, and said shims being of different lengths and thicknesses, the longer the shim the greater the thickness, and fastening members extending through said shear bar and shims and into said support, said fastening members being disposed to pass through said lateral edges of some of said shims, at least.

4. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising a plurality of shims positioned one against another between said support and said shear bar, each shim having end bearing edges which extend generally perpendicular to the elongation of the shear bar and support, and said shims being of different lengths and thicknesses, the longer the shim the greater the thickness, and fastening members extending through said shear bar and shims and into said support, said fastening members being disposed to pass through said lateral edges of some of said shims, at least, all of the lateral edges of said shims being so beveled, that the side of each shim facing said shear bar has a length shorter than the side of the shim facing said support.

5. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising first, second and third shims positioned successively one against the other between said support and said shear bar, each shim having end bearing edges which extend generally perpendicular to the elongation of the shear bar and support, said first shim having a given length and a given thickness, said second shim having a shorter length and less thickness than said first shim, and said third shim having a length and thickness greater than said second shim and less than said first shim.

6. An elongated support having a flat supporting surface, an elongated shear bar mountable on said support and facing said surface, said shear bar having a cutting edge extending in the direction of elongation of said support and normally being straight, and means for connecting said shear bar to said support whereby the shear bar, including said cutting edge, is bowed, a medial portion of the bar being further from the support than the ends of the bar, said means comprising first, second and third shims positioned successively one against the other between said support and said shear bar, each shim having end bearing edges which extend generally perpendicular to the elongation of the shear bar and support, said first shim having a given length and a given thickness, said second shim having a shorter length and less thickness than said first shim, and said third shim having a length and thickness greater than said second shim and less than said first shim, and fastening members extending through said shear bar and shims and into said support, said fastening members being disposed to pass through said lateral edges of some of said shims, at least.

7. An elongated support having a flat supporting surface, an elongated shear bar mountable on said support and facing said surface, said shear bar having a cutting edge extending in the direction of elongation of said support and normally being straight, and means for connecting said shear bar to said support whereby the knife, including said cutting edge, is bowed, a medial portion of the bar being further from the support than the ends of the bar, said means comprising a plurality of shims positioned one against another between said support and said bar, said shims being of different lengths and different thicknesses and each having end bearing edges which extend transverse to the elongation of the shear bar and support, and fastening members extending through said shear bar and said shims and into said support.

References Cited in the file of this patent

UNITED STATES PATENTS

| 2,399,529 | Willits | Apr. 30, 1946 |
| 2,868,253 | Kirk | Jan. 13, 1959 |

FOREIGN PATENTS

| 2,767 | Great Britain | Mar. 18, 1872 |
| 386,210 | Great Britain | Jan. 12, 1933 |